(12) United States Patent
Madhusudana et al.

(10) Patent No.: US 8,782,292 B2
(45) Date of Patent: Jul. 15, 2014

(54) METHODS AND STRUCTURE FOR PERFORMING A REBUILD OF A LOGICAL VOLUME WITH A SERIAL ATTACHED SCSI EXPANDER

(71) Applicant: LSI Corporation, Milpitas, CA (US)

(72) Inventors: Naresh Madhusudana, Bangalore (IN); Naveen Krishnamurthy, Bangalore (IN)

(73) Assignee: LSI Corporation, Milpitas, CA (US)

( * ) Notice: Subject to any disclaimer, the term of this patent is extended or adjusted under 35 U.S.C. 154(b) by 41 days.

(21) Appl. No.: 13/664,886

(22) Filed: Oct. 31, 2012

(65) Prior Publication Data
US 2014/0122744 A1    May 1, 2014

(51) Int. Cl.
G06F 13/38     (2006.01)
G06F 3/00      (2006.01)

(52) U.S. Cl.
USPC ............. 710/2; 710/5; 710/7; 710/11; 710/15

(58) Field of Classification Search
None
See application file for complete search history.

(56) References Cited

U.S. PATENT DOCUMENTS

| | | | |
|---|---|---|---|
| 4,156,798 A | 5/1979 | Doelz | |
| 5,335,227 A | 8/1994 | Smith | |
| 5,579,480 A | 11/1996 | Cidon | |
| 6,096,116 A | 8/2000 | Huff et al. | |
| 6,199,137 B1 | 3/2001 | Aguilar | |
| 6,301,642 B1 | 10/2001 | Jones et al. | |
| 6,611,863 B1 | 8/2003 | Baginwar | |
| 7,650,446 B2 | 1/2010 | Nonaka et al. | |
| 7,738,366 B2 | 6/2010 | Uddenberg | |
| 7,912,992 B2 | 3/2011 | Suzuki | |
| 2002/0046566 A1 | 4/2002 | Liao | |
| 2003/0076788 A1 | 4/2003 | Grabauskas et al. | |
| 2003/0097438 A1 | 5/2003 | Bearden | |
| 2003/0217212 A1 | 11/2003 | Kim | |
| 2004/0205288 A1 | 10/2004 | Ghaffari | |
| 2005/0015532 A1 | 1/2005 | Beckett | |
| 2005/0066100 A1 | 3/2005 | Elliott | |
| 2005/0080881 A1 | 4/2005 | Voorhees | |
| 2006/0101171 A1 | 5/2006 | Grieff | |
| 2006/0156055 A1 | 7/2006 | Cherian | |
| 2007/0220204 A1 | 9/2007 | Nakajima | |
| 2007/0226415 A1 | 9/2007 | Holland | |
| 2008/0189723 A1 | 8/2008 | Elliott | |
| 2009/0094620 A1 | 4/2009 | Kalwitz | |
| 2011/0145452 A1 | 6/2011 | Schilling | |
| 2012/0084486 A1 | 4/2012 | Jinno | |

(Continued)

OTHER PUBLICATIONS

IBM SAS RAID Controller Module, Installation and user guide v2, © Copyright IBM Corp. 2008, 2009.

(Continued)

*Primary Examiner* — Scott Sun
(74) *Attorney, Agent, or Firm* — Duft Bornsen & Fettig

(57) ABSTRACT

Methods and structure are provided for performing a rebuild using a Serial Attached SCSI (SAS) expander. The SAS expander includes an SMP target operable to receive, from a Redundant Array of Independent Disks (RAID) controller, a Serial Management Protocol (SMP) command for initiating a rebuild of a RAID volume at the SAS expander. The SAS expander also includes a control unit operable to initiate a rebuild of the RAID volume based on the received SMP command from the controller, and a Serial SCSI Protocol (SSP) initiator operable to generate SSP commands for performing the RAID rebuild based upon input from the control unit.

20 Claims, 14 Drawing Sheets

(56) References Cited

U.S. PATENT DOCUMENTS

2012/0124286 A1* 5/2012 Galloway et al. ............ 711/114
2012/0144082 A1   6/2012 Romero
2012/0254535 A1* 10/2012 Hay et al. .................... 711/114
2013/0013828 A1   1/2013 Pang et al.

OTHER PUBLICATIONS

Intel® RAID Expander RES2SV240, Product Brief.
Nested RAID levels, wikipedia, downloaded on Oct. 8, 2012.
U.S. Appl. No. 13/096,404, "Remote Execution of RAID in Large Topologies," filed Apr. 28, 2011.
U.S. Appl. No. 13/171,922, "Methods and Apparatus for Increasing Storage Network Perfromance by Managing a Logical Volume in a Storage Network Switching Component," filed Jun. 29, 2011.
U.S. Appl. No. 13/281,301, "Methods and Systems Using Solid-State Drives As Storage Controller Cache Memory," filed Oct. 25, 2011.
U.S. Appl. No. 13/365,050, "Methods and Structure for an Improved Solid-State Drive for Use in Caching Applications," filed Feb. 2, 2012.

* cited by examiner

| BYTE | FIELD |
|---|---|
| 0 | SMP FRAME TYPE (40H -- SMP REQUEST) |
| 1 | FUNCTION (VENDOR SPECIFIC -- INDICATES RAID REBUILD STATUS CHECK) |
| 2 | ALLOCATED RESPONSE LENGTH |
| 3 | REQUEST LENGTH = 2 |
| 4 | TASK TYPE |
| 5 | TASK ID |

| BYTE | FIELD |
|---|---|
| 0 | SMP FRAME TYPE (41H -- SMP RESPONSE) |
| 1 | FUNCTION (VENDOR SPECIFIC -- INDICATES RAID REBUILD STATUS) |
| 2 | RESULT (SUCCESS/BUSY/FAILURE) |
| 3 | RESPONSE LENGTH (DEPENDS ON ERROR DETAILS) |
| ... | ERROR DETAILS |
| ... | CRC |

| BYTE | FIELD |
|---|---|
| 0 | SMP FRAME TYPE (40H -- SMP REQUEST) |
| 1 | FUNCTION (VENDOR SPECIFIC -- RAID VOLUME INFORMATION) |
| 2 | ALLOCATED RESPONSE LENGTH |
| 3 | REQUEST LENGTH |
| 4 | VOLUME TYPE |
| 5 | VOLUME ID |
| 6 | NUMBER OF SOURCE DRIVES (N) |
| 7 | SAS ADDRESS OF SOURCE DRIVE |
| ... | SAS ADDRESS OF SOURCE DRIVE |
| ... | STARTING LOGICAL BLOCK ADDRESS |
| ... | SECTOR SIZE |
| ... | NUMBER OF SECTORS |
| ... | REGION SIZE FOR LOCKS |
| ... | CYCLIC REDUNDANCY CHECK |

| BYTE | FIELD |
|---|---|
| 0 | SMP FRAME TYPE (41H -- SMP RESPONSE) |
| 1 | FUNCTION (VENDOR SPECIFIC -- RAID VOLUME |
| 2 | FUNCTION RESULT (ACCEPTED OR FAILED) |
| 3 | RESPONSE LENGTH -- 0 |
| ... | CYCLIC REDUNDANCY CHECK |

| BYTE | FIELD |
|---|---|
| 0 | SMP FRAME TYPE (40H -- SMP REQUEST) |
| 1 | FUNCTION (VENDOR SPECIFIC -- FORCE COPY BACK) |
| 2 | ALLOCATED RESPONSE LENGTH |
| 3 | REQUEST LENGTH = 2 |
| 4 | DRIVE DETAILS WHERE SMART ERROR IS OBSERVED |
| 5 | VOLUME ID |

| BYTE | FIELD |
|---|---|
| 0 | SMP FRAME TYPE (41H -- SMP RESPONSE) |
| 1 | FUNCTION (VENDOR SPECIFIC -- FORCE COPY BACK) |
| 2 | FUNCTION RESULT (SUCCESS OR FAILURE) |
| ... | CYCLIC REDUNDANCY CHECK |

| BYTE | FIELD |
|---|---|
| 0 | SMP FRAME TYPE (40H -- SMP REQUEST) |
| 1 | FUNCTION (VENDOR SPECIFIC -- VOLUME STATUS) |
| 2 | ALLOCATED RESPONSE LENGTH |
| 3 | REQUEST LENGTH = 2 |
| 4 | VOLUME STATUS (DEGRADED, REBUILD COMPLETE, REBUILD FAILED) |
| 5 | VOLUME ID |

| BYTE | FIELD |
|---|---|
| 0 | SMP FRAME TYPE (41H -- SMP RESPONSE) |
| 1 | FUNCTION (VENDOR SPECIFIC -- VOLUME STATUS) |
| 2 | FUNCTION RESULT (SUCCESS OR FAILURE) |
| ... | CYCLIC REDUNDANCY CHECK |

| BYTE | FIELD |
|---|---|
| 0 | SMP FRAME TYPE (40H -- SMP REQUEST) |
| 1 | FUNCTION (VENDOR SPECIFIC -- REGION LOCK REQUEST) |
| 2 | REQUEST LENGTH (DEPENDS ON REGION SIZE) |
| 3 | VOLUME ID |
| ... | STARTING LOGICAL BLOCK ADDRESS |
| ... | REGION SIZE |
| ... | CYCLIC REDUNDANCY CHECK |

| BYTE | FIELD |
|---|---|
| 0 | SMP FRAME TYPE (41H -- SMP RESPONSE) |
| 1 | FUNCTION (VENDOR SPECIFIC -- REGION LOCK REQUEST) |
| 2 | FUNCTION RESULT (SUCCESS OR FAILURE) |
| ... | CYCLIC REDUNDANCY CHECK |

METHODS AND STRUCTURE FOR PERFORMING A REBUILD OF A LOGICAL VOLUME WITH A SERIAL ATTACHED SCSI EXPANDER

BACKGROUND

1. Field of the Invention

The invention relates generally to Serial Attached SCSI (SAS) domains and more specifically relates to enhanced SAS expanders.

2. Discussion of Related Art

In SAS domains (i.e., electronic systems implementing a switched SAS fabric), it is common for a Redundant Array of Independent Disks (RAID) controller to manage a large number of RAID logical volumes. RAID volumes offer benefits over other logical volumes because RAID volumes provide striped data for enhanced performance, yet also provide redundancy information for data.

SAS storage devices that provision RAID logical volumes are coupled for communication with the RAID controller via one or more SAS expanders. The SAS expanders route commands from the RAID controller to the appropriate storage devices.

When a RAID controller manages RAID volumes, common tasks may include managing input and output (I/O) commands from a host device, performing consistency checks on the volumes, etc. If data on a volume is corrupted, it may further be desirable for the controller to initiate a rebuild of the damaged part of the RAID volume (using redundancy information within the volume). For example, data from a faulty storage device may be transferred to a "hot spare" storage device.

Rebuilding a logical volume takes up substantial amounts of processing power at the controller, because the controller generates and transmits a vast number of I/O commands to various storage devices as it rebuilds the volume. This is undesirable because the rebuild occupies processing resources at the controller that could otherwise be used to process host I/O. Furthermore, the rebuild process can reduce the available bandwidth of the entire SAS domain, because communication channels between the controller and the expanders that route rebuild I/O to the appropriate storage devices may be occupied for the entire duration of the rebuild process. This precludes other connections that would use the same pathways through the SAS expanders.

Thus it is an ongoing challenge to enhance the performance of a RAID controller in processing host I/O when a RAID volume is being rebuilt.

SUMMARY

The present invention addresses the above and other problems, thereby advancing the state of the useful arts, by providing methods and structure for a RAID controller to offload rebuild operations to a SAS expander. Thus, the SAS expander generates and manages the rebuild process, freeing the RAID controller to process host I/O as desired. At the same time, the RAID controller may manage the rebuild and check on the progress of the rebuild at the expander to ensure that the rebuild is progressing as desired.

In one aspect hereof, a Serial Attached SCSI (SAS) system is provided comprising a SAS expander. The SAS expander includes an SMP target operable to receive, from a Redundant Array of Independent Disks (RAID) controller, a Serial Management Protocol (SMP) command for initiating a rebuild of a RAID volume at the SAS expander. The SAS expander also includes a control unit operable to initiate a rebuild of the RAID volume based on the received SMP command from the controller, and a Serial SCSI Protocol (SSP) initiator operable to generate SSP commands for performing the RAID rebuild based upon input from the control unit.

Another aspect hereof provides a method. The method comprises receiving, at an SMP target of a SAS expander, a Serial Management Protocol (SMP) command from a Redundant Array of Independent Disks (RAID) controller for initiating a rebuild of a RAID volume. The method also includes initiating, via a control unit of the expander, a rebuild of the RAID volume based on the received SMP command from the controller, and generating, at a Serial SCSI Protocol (SSP) initiator, SSP commands for performing the RAID rebuild based upon input from the control unit. Further, the method includes transmitting the generated SSP commands to storage devices that provision the RAID volume.

Another aspect hereof provides a non-transitory computer readable medium embodying programmed instructions which, when executed by a processor, are operable for performing a method. The method comprises receiving, at an SMP target of a SAS expander, a Serial Management Protocol (SMP) command from a Redundant Array of Inexpensive Disks (RAID) controller for initiating a rebuild of a RAID volume. The method also includes initiating, via a control unit of the expander, a rebuild of the RAID volume based on the received SMP command from the controller, and generating, at a Serial SCSI Protocol (SSP) initiator, SSP commands for performing the RAID rebuild based upon input from the control unit. Further, the method includes transmitting the generated SSP commands to storage devices that provision the RAID volume.

Other exemplary embodiments (e.g., methods and computer-readable media relating to the foregoing embodiments) may be described below.

BRIEF DESCRIPTION OF THE DRAWINGS

FIG. 9 is a block diagram illustrating an exemplary SMP request for a status update regarding a rebuild of a RAID volume in accordance with features and aspects hereof.

FIG. 10 is a block diagram illustrating an exemplary SMP response to a request for a status update regarding a rebuild of a RAID volume in accordance with features and aspects hereof.

FIG. 12 is a block diagram illustrating an exemplary SMP command from a RAID controller to assign a RAID volume to an expander in accordance with features and aspects hereof.

FIG. 13 is a block diagram illustrating an exemplary SMP response from an expander after receiving an SMP command to assign a RAID volume to the expander in accordance with features and aspects hereof.

FIG. 14 is a block diagram illustrating an exemplary SMP command from a RAID controller to initiate a rebuild of a RAID volume at an expander in accordance with features and aspects hereof.

FIG. 15 is a block diagram illustrating an exemplary SMP response from an expander indicating whether a request to rebuild a RAID volume has been accepted in accordance with features and aspects hereof.

FIG. 16 is a block diagram illustrating an exemplary SMP command from an expander to a RAID controller to describe a degraded RAID volume in accordance with features and aspects hereof.

FIG. 17 is a block diagram illustrating an exemplary SMP response from a RAID controller to a SAS expander to the SMP command of FIG. 16 in accordance with features and aspects hereof.

FIG. 18 is a block diagram illustrating an exemplary SMP command from an expander to a RAID controller requesting a lock for a portion of a degraded RAID volume in accordance with features and aspects hereof.

FIG. 19 is a block diagram illustrating an exemplary SMP response to the SMP command of FIG. 18 from a RAID controller to an expander in accordance with features and aspects hereof.

DETAILED DESCRIPTION OF THE DRAWINGS

Figure 1:
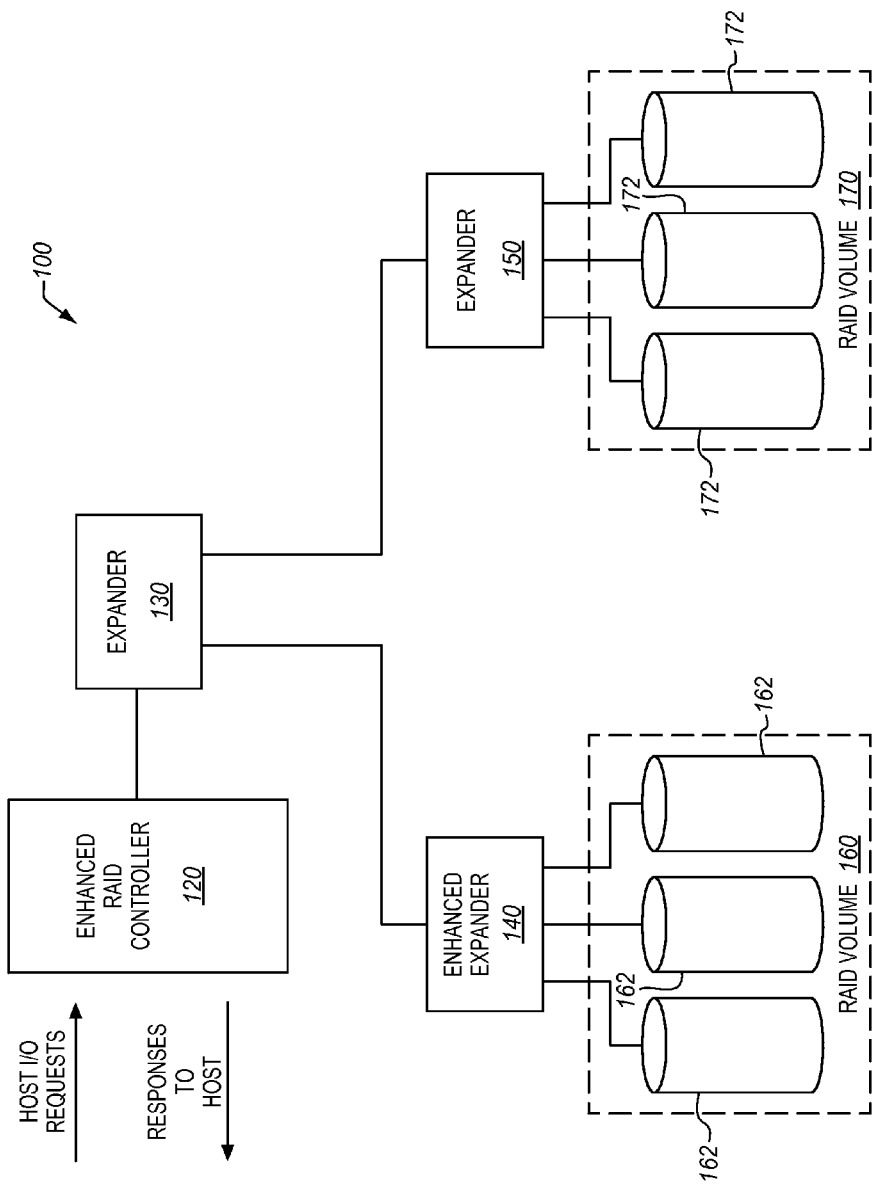
FIG. 1 is a block diagram of an exemplary SAS domain in accordance with features and aspects hereof.

FIG. 1 is a block diagram of an exemplary Serial Attached SCSI (SAS) domain 100 in accordance with features and aspects hereof. In this embodiment, SAS domain 100 includes enhanced Redundant Array of Independent Disks (RAID) controller 120 and enhanced expander 140. RAID controller 120 has been enhanced to generate Serial Management Protocol (SMP) commands to trigger a SAS expander 140 to perform a rebuild process of a RAID volume. Expander 140 has been enhanced to generate, transmit, and manage the various Input/Output (I/O) commands of the rebuild in response to receiving the SMP rebuild command. This frees processing resources on RAID controller 120 and enables RAID controller 120 to better process I/O for the host.

In this embodiment, SAS domain 100 receives I/O from a host. The host reads from and writes to RAID volumes 160 and 170, which are managed by RAID controller 120. The host may comprise any suitable system capable of performing processing operations upon stored data (e.g., a server, general purpose computer, etc.).

Enhanced RAID controller 120 is a SAS compliant component that manages one or more RAID volumes, and is operable to process incoming host I/O directed to the RAID volumes that it manages. In this embodiment, RAID controller 120 manages RAID volumes 160 and 170. When RAID controller 120 detects that a rebuild should be performed on a RAID volume, it is operable to generate an SMP command requesting that a SAS expander perform a rebuild of the volume. RAID controller 120 may be implemented, for example, as custom circuitry, as a special or general purpose processor executing programmed instructions stored in an associated program memory, or some combination thereof. RAID controller 120 may comprise an independent SAS device, a Host Bus Adapter (HBA) of a host, an integrated component of a host, etc.

Expanders 130 and 150 comprise SAS expanders that are capable of routing commands between RAID controller 120 and the storage devices that provision RAID volumes managed by RAID controller 120. For example, expander 130 may establish connections between RAID controller 120 and expander 150, while expander 150 may manage connections between expander 130 and storage devices 172.

Expander 140 performs similar operations to the expanders discussed above. Furthermore, in response to receiving an SMP command from RAID controller 120, expander 140 may generate Serial SCSI Protocol (SSP) I/O commands for performing a rebuild of a RAID volume (e.g., RAID volume 160). These SSP I/O commands may be directed to any storage devices that provision the RAID volume. Thus, the SSP commands may direct the operations of storage devices that are not directly coupled with expander 140. For example, the SSP I/O commands may be sent across one or more expanders before they reach their destinations.

The number, configuration, and type of expanders that form the switched fabric of SAS domain 100 may vary as a matter of design choice. For example, in one embodiment enhanced RAID controller 120 is directly coupled with enhanced expander 140. In further embodiments, a large and complex switched fabric may separate the components of SAS domain 100. In still further embodiments, any number of expanders and/or RAID controllers of SAS domain 100 may exhibit the enhanced features described herein.

RAID volumes 160 and 170 comprise allocated storage space and data provisioned on storage devices 162 and storage devices 172, respectively. The RAID volumes may be set up in any suitable RAID configuration (e.g., RAID 1, 10, 5, 60, 1E, etc.). Each RAID volume may be provisioned on a greater or lesser number of storage devices as a matter of design choice. The storage devices need not be dedicated to one specific RAID volume, but may also store data for a number of other logical volumes. Still further, a RAID volume may be provisioned on multiple storage devices that are remotely located from each other on the SAS domain.

Storage devices 162 and storage devices 172 provision the storage capacity of their respective RAID volumes, and may comprise any media and/or interfaces capable of storing and/or retrieving data in a computer-readable format. For example, the storage devices may comprise magnetic hard disks, solid state drives, optical media, etc. compliant with protocols for one or more of SAS, SATA, Fibre Channel, etc. The number of storage devices utilized by SAS domain 100 may vary as a matter of design choice.

Figure 2:
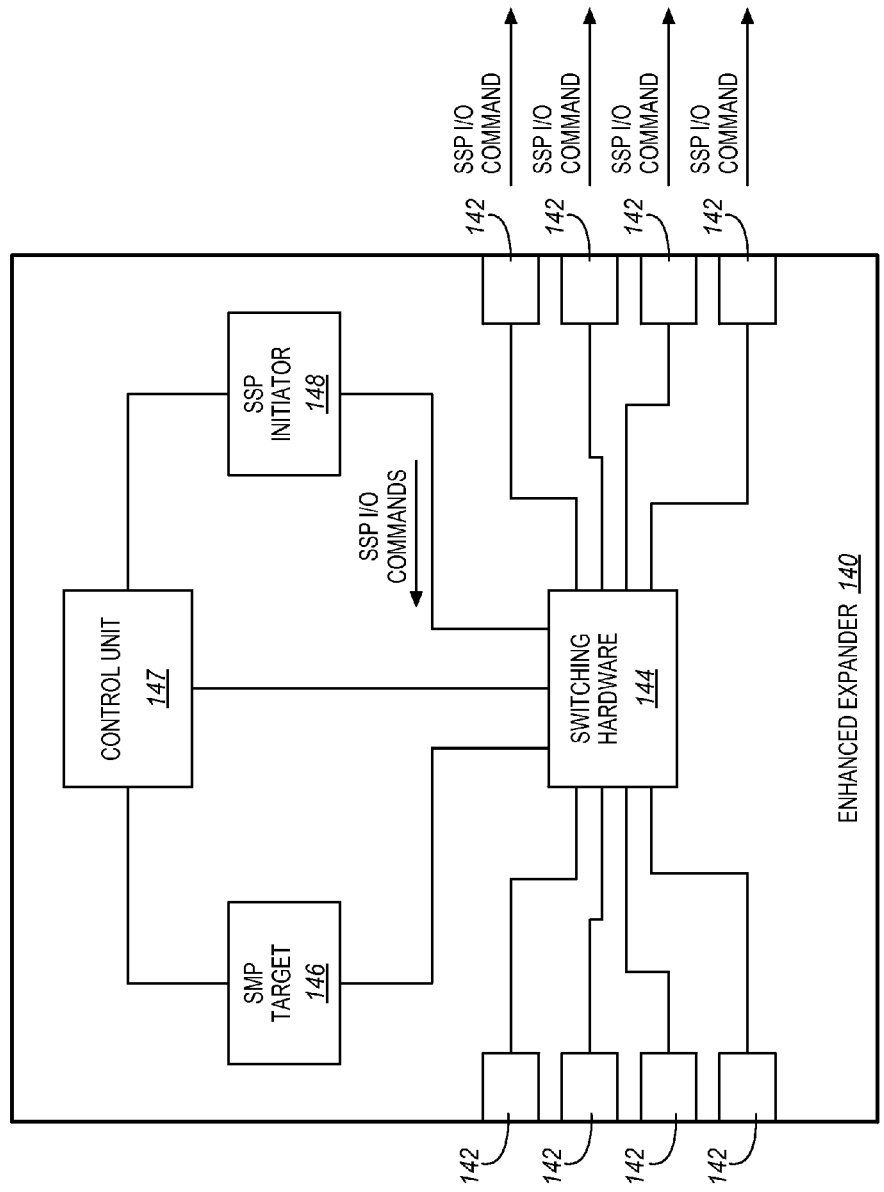
FIG. 2 is a block diagram of an exemplary SAS expander in accordance with features and aspects hereof.

FIG. 2 is a block diagram of an exemplary enhanced SAS expander 140 in accordance with features and aspects hereof. According to FIG. 2, enhanced SAS expander 140 includes multiple SAS ports 142. Each SAS port comprises one or more physical links with associated transceivers (PHYs).

SAS expander 140 further includes switching hardware 144, which is operable to establish connections between various PHYs in order to enable communications between them. The operations of switching hardware 144 (e.g. a "crossbar" switch) are managed by control logic and hardware at expander 140, which in this embodiment is a component of control unit 147. Control unit 147 may be implemented, for example, as custom circuitry, as a special or general purpose processor executing programmed instructions stored in an associated program memory, or some combination thereof.

Enhanced SAS expander 140 further includes SMP target 146 and SSP initiator 148. SMP target 146 receives incoming SMP commands from a host, and control unit 147 reviews the incoming SMP commands to initiate a rebuild operation of a RAID volume. Control unit 147 also directs the operations of SSP initiator 148 to generate SSP I/O commands sent to the storage devices that provision the RAID volume.

SMP target 146 may be integrated within expander 140 as an element of control unit 147, or may comprise an independent processing element of expander 140. In one embodiment, SMP target 146 is associated with a SAS address and therefore appears to other elements of SAS domain 100 as an end device coupled to expander 140. When incoming SMP commands directed to SMP target 146 are received at expander 140, they are forwarded to SMP target 146 by switching hardware 144 and/or control unit 147. SMP target 146 may then process the incoming SMP commands and provide them to control unit 147 for processing.

SSP initiator 148 may be integrated within expander 140 as an element of control unit 147, or may comprise an independent processing element within expander 140. In one embodiment, SSP initiator 148 is associated with a SAS address and appears to other elements of SAS domain 100 as an end device coupled to expander 140. Incoming SSP responses directed to SSP initiator 148 are received at expander 140, and are then forwarded to SSP initiator 148 by switching hardware 144 and/or control unit 147. SSP initiator 148 may then process the received data from the SSP commands and provide it to control unit 147, which may manage the rebuild process. The generation and issuance of RAID rebuild operations involving the regeneration of missing data using redundancy information are well-known to those of ordinary skill in the art.

Figure 3:
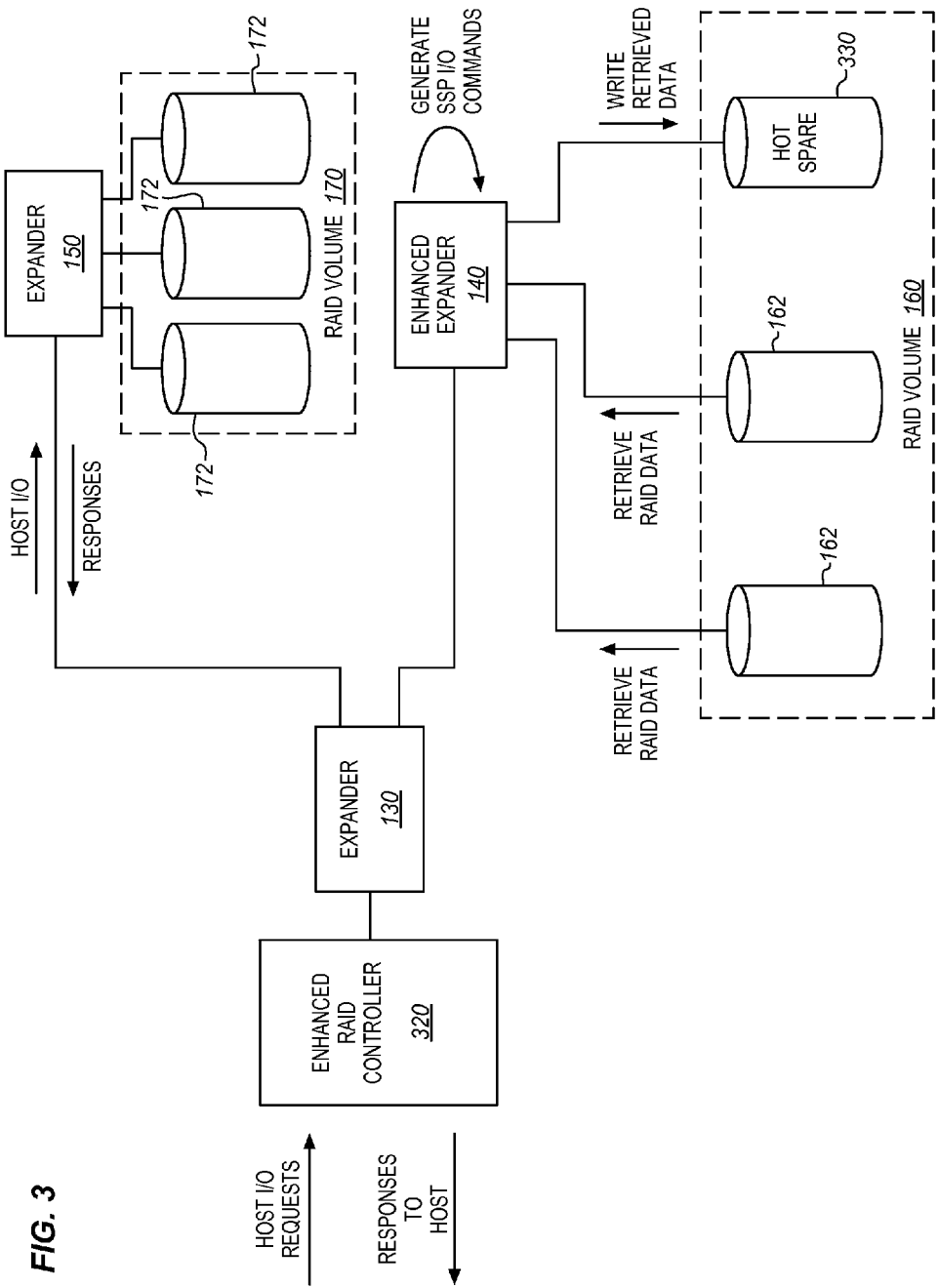
FIG. 3 is a block diagram of actions performed in an exemplary SAS domain in accordance with features and aspects hereof.

FIG. 3 is a block diagram of actions performed in an exemplary SAS domain in accordance with features and aspects hereof FIG. 3 illustrates the operation of the various components of SAS domain 100 discussed above with respect to FIGS. 1-2. According to FIG. 3, a host sends I/O commands to RAID controller 320. RAID controller 320, while managing operations directed to RAID volume 160, determines that a rebuild of a portion of RAID volume 160 is appropriate. For example, RAID controller 320 may detect an impending failure (e.g., a Self-Monitoring, Analysis, and Reporting Technology (SMART) error) or an actual failure on one of storage devices 162, and may then trigger the rebuild based on the detected error.

When the error is detected, RAID controller 320 issues an SMP rebuild request to an SMP target at enhanced expander 140. Enhanced expander 140 then proceeds to generate and issue SSP I/O commands to retrieve data from the RAID volume and rebuild the volume using hot spare 330. While the rebuild is being performed, RAID controller 320 may continue to issue host I/O to RAID volume 170, and may even manage host I/O directed to portions of RAID volume 160 that are not being rebuilt.

Thus, implementing the RAID rebuild at expander 140 frees up processing resources at RAID controller 320. The rebuild process (performed by expander 140) is independent of the processing of host I/O (performed by RAID controller 320). Thus, the processing of the host I/O commands at RAID controller 320 does not delay processing of the rebuild at expander 140, and the processing of the rebuild at expander 140 does not delay processing of the host I/O commands at RAID controller 320. This results in a processing benefit for the host, because I/O commands from the host are processed more quickly than they would be by prior systems. Furthermore, paths through expander 130 and expander 150 may remain available for other communications.

Note that the particular arrangement of components described herein is merely intended to be exemplary, and one of ordinary skill in the art will appreciate that the specific arrangement and configuration of SAS components is merely a matter of design choice.

Figure 4:
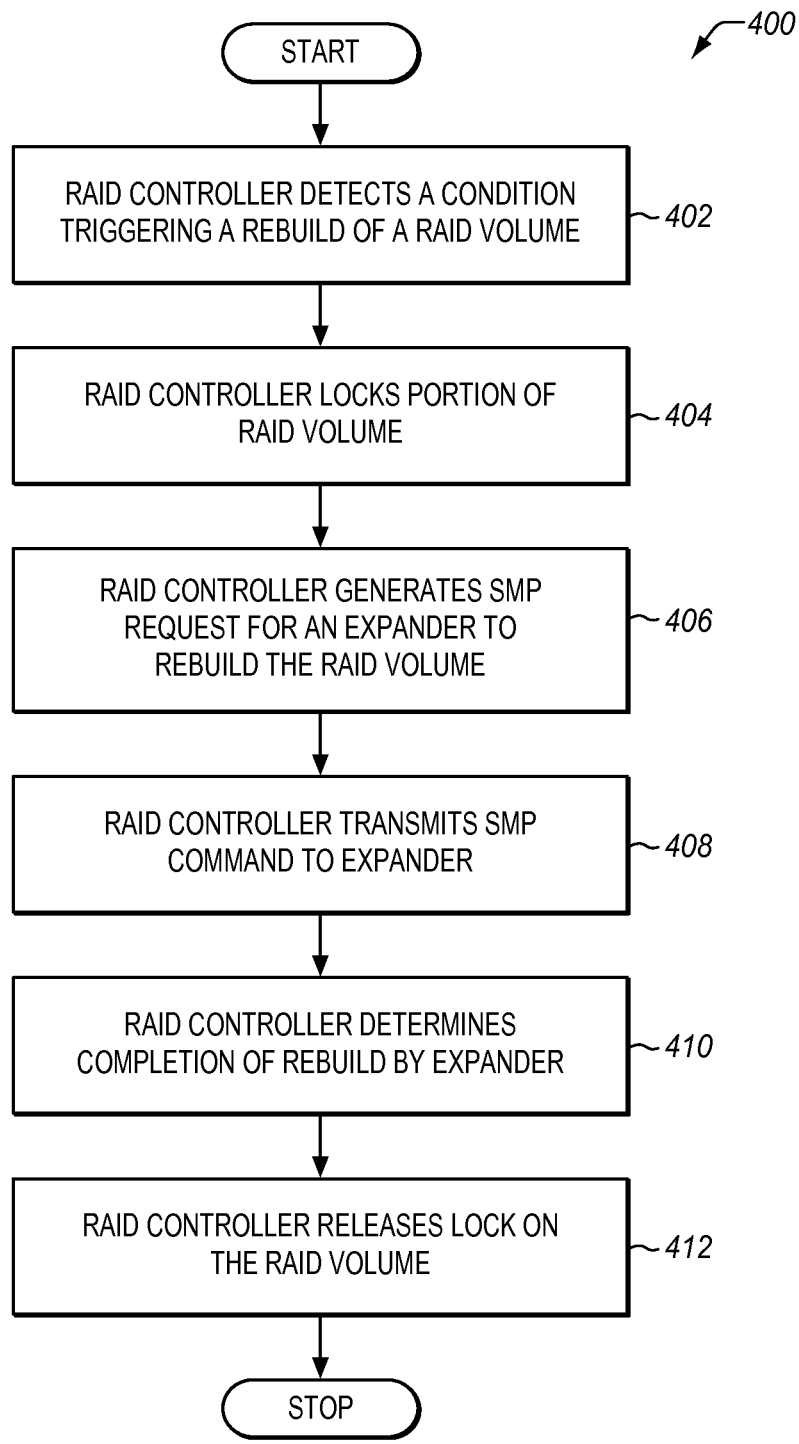
FIG. 4 is a flowchart illustrating a method in accordance with features and aspects hereof to oversee, via a RAID controller, a rebuild of a RAID volume in an exemplary embodiment.

FIG. 4 is a flowchart illustrating a method in accordance with features and aspects hereof to oversee, via a RAID controller, a rebuild of a RAID volume in an exemplary embodiment. The method of FIG. 4 may be operable in a SAS domain such as described above with regard to FIGS. 1-3. The steps of the flowcharts described herein are not all inclusive and may include other steps not shown. The steps described herein may also be performed in an alternative order.

In step 402, the RAID controller detects a condition triggering a rebuild of a RAID volume. For example, a storage device implementing the RAID volume may fail, data on the volume (or a portion thereof) may be corrupted, an impending SMART error may be detected, etc.

In step 404, the RAID controller locks the RAID volume that is being rebuilt. Locking the RAID volume may include queuing or blocking/discarding incoming host I/O that is directed to the portion of the volume that is being rebuilt.

In step 406, the RAID controller generates an SMP request for an expander to rebuild the RAID volume. Before the SMP request is generated, the RAID controller may consult information in memory to determine which SAS expanders of the domain are enhanced. This information may be acquired, for example, during discovery.

In step 408, the RAID controller transmits the SMP command to an enhanced expander. At this time, the expander initiates a rebuild process which will be discussed in further detail with regard to FIG. 5. During this rebuild process, the RAID controller itself need not generate SSP I/O commands for the rebuild, so the RAID controller is free to process host I/O directed to different RAID volumes (or even unlocked portions of the RAID volume being rebuilt).

In step 408, the RAID controller determines that the expander has completed the rebuild process. For example, the RAID controller may send periodic SMP queries to the expander to check on the status of the rebuild. In a further embodiment, the expander may be operable to automatically send an SMP completion message to the RAID controller when the rebuild has been completed.

In step 410, the RAID controller unlocks the locked portion of the RAID volume. Thus, the newly rebuilt portion of the RAID volume is ready for host I/O. The RAID controller may therefore process any queued host I/O for the previously locked portion of the volume.

Figure 5:
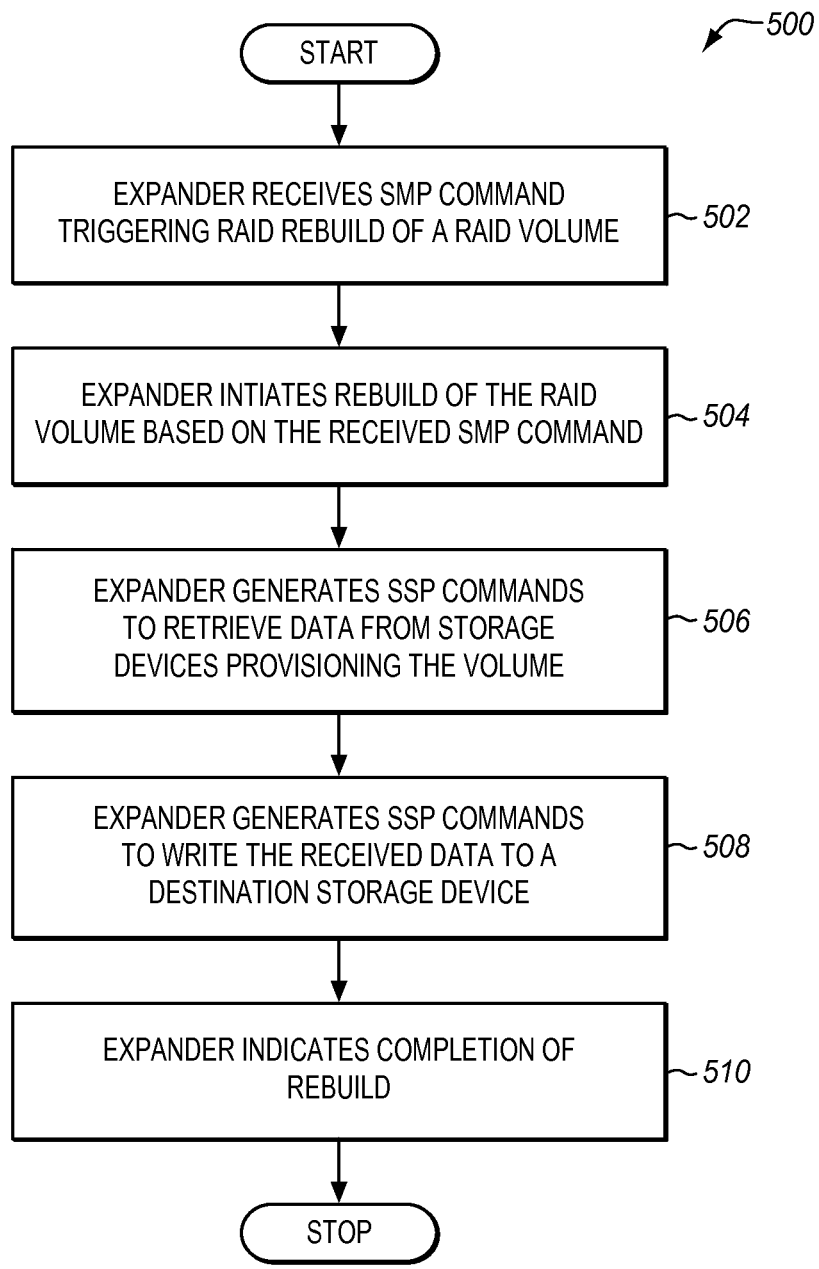
FIG. 5 is a flowchart illustrating a method in accordance with features and aspects hereof to actively perform, via a SAS expander, a rebuild of a RAID volume in an exemplary embodiment.

FIG. 5 is a flowchart illustrating a method in accordance with features and aspects hereof to actively perform, via a SAS expander, a rebuild of a RAID volume in an exemplary embodiment.

In step 502, the expander receives an SMP command from a RAID controller triggering (e.g., requesting) a rebuild of a RAID volume. The storage devices provisioning the RAID volume may be directly coupled to the expander, or may be coupled via one or more intermediate expanders in the SAS domain.

In step 504, the expander initiates a rebuild of the RAID volume based on the received SMP command. Initiation of the rebuild may include, for example, storing information in memory associating a task identifier with the rebuild, storing information indicating the storage devices to perform the rebuild upon, storing information indicating destination storage devices (e.g., "hot spares") to utilize during the rebuild, logical block addresses to rebuild, etc. Some of this information may be provided in the received SMP command, while other information may be determined by querying the storage devices to acquire configuration information for the volumes that they provision.

In step 506, the expander generates SSP commands to retrieve data from storage devices that provision the RAID volume. In step 508, the expander generates SSP commands to write the received data to a destination storage device. If the volume is striped, then generating the SSP commands may further include generating appropriately striped data, based on the data that has already been received.

During this process, the expander may update progress information in memory, and may periodically provide this information to the RAID controller that initiated the rebuild (e.g., in response to queries from the RAID controller).

In step 510, the expander indicates completion of the rebuild. For example, the expander may update progress information in memory indicating that the rebuild has been completed, or may comprise reporting that the rebuild was completed successfully to a RAID controller.

Figure 6:
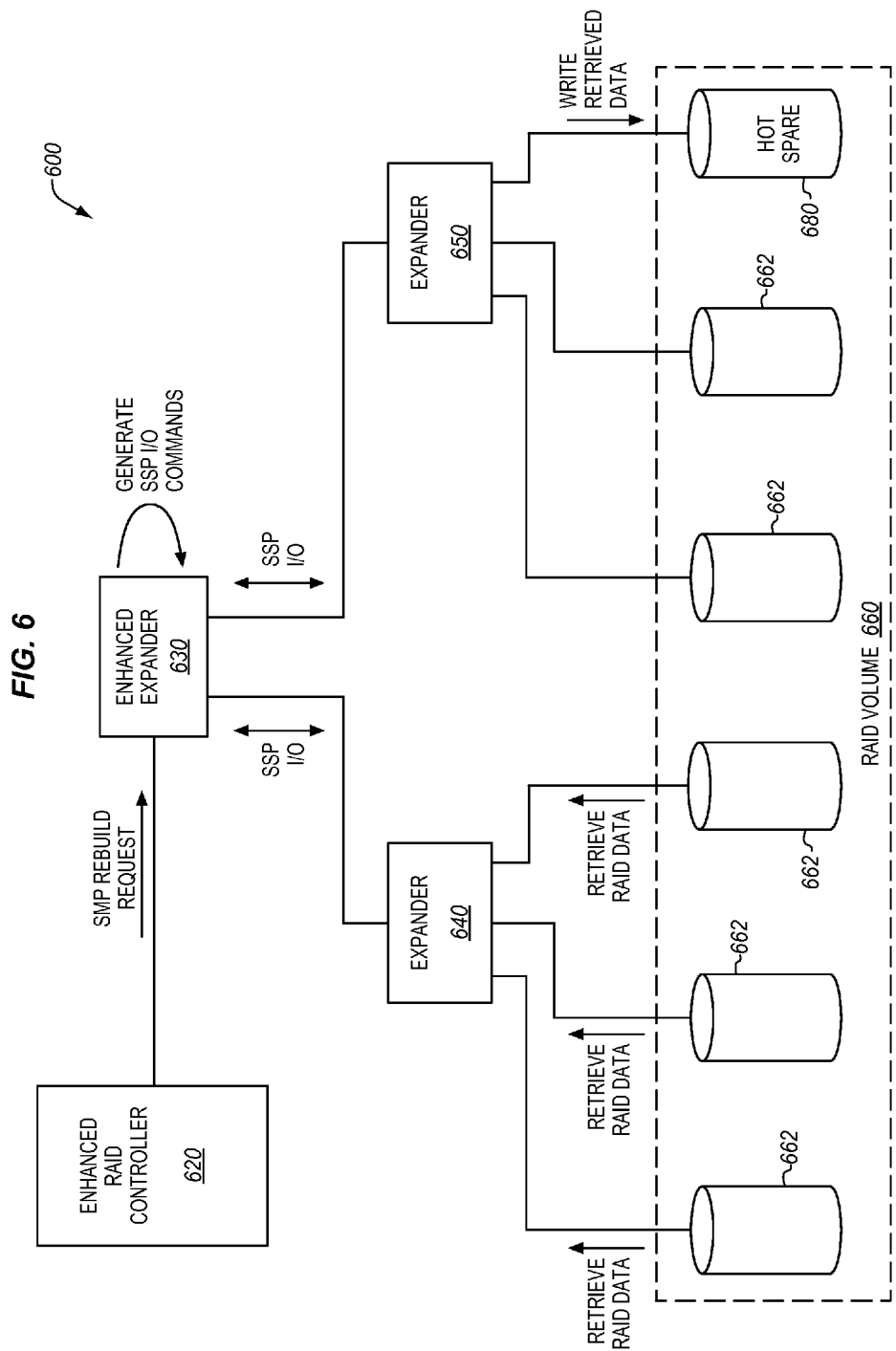
FIG. 6 illustrates an exemplary rebuild being performed by a SAS expander that is not directly coupled with the storage devices implementing a RAID volume in accordance with features and aspects hereof.

FIG. 6 illustrates an exemplary rebuild being performed by a SAS expander that is not directly coupled with the storage devices implementing a RAID volume 660 in accordance with features and aspects hereof. In this embodiment, enhanced expander 630 of SAS domain 600 receives an SMP request from RAID controller 120 to rebuild RAID volume 660. RAID volume 660 is provisioned by storage devices 662, which are variously coupled with either expander 640 or expander 650.

An SSP initiator within enhanced expander 630 generates SSP commands to retrieve data from storage devices coupled to expander 640. If the SSP initiator does not have its own SAS address, it may fill the generated SSP commands with the SAS address of enhanced expander 630, or of enhanced RAID controller 620. Responses to the SSP commands are then provided by the storage devices to enhanced expander 630. SSP initiator then generates write commands directed to hot spare 680.

In a further embodiment, the SSP initiator tags each of its requests with a SAS address that does not exist on the SAS domain. Because the expanders beneath SAS expander 630 do not have an entry for the nonexistent SAS address, they use subtractive routing to route incoming responses from the storage devices. This sends the SSP responses up the hierarchy until they reach enhanced expander 630.

In a further embodiment, an expander such as expander 640 may perform the rebuild operation of RAID volume 640. For example, in embodiments where expander 640 has a SAS address, or where an SSP initiator of expander 640 has a SAS address, the commands may be properly routed to and from the various storage devices.

Figure 7:
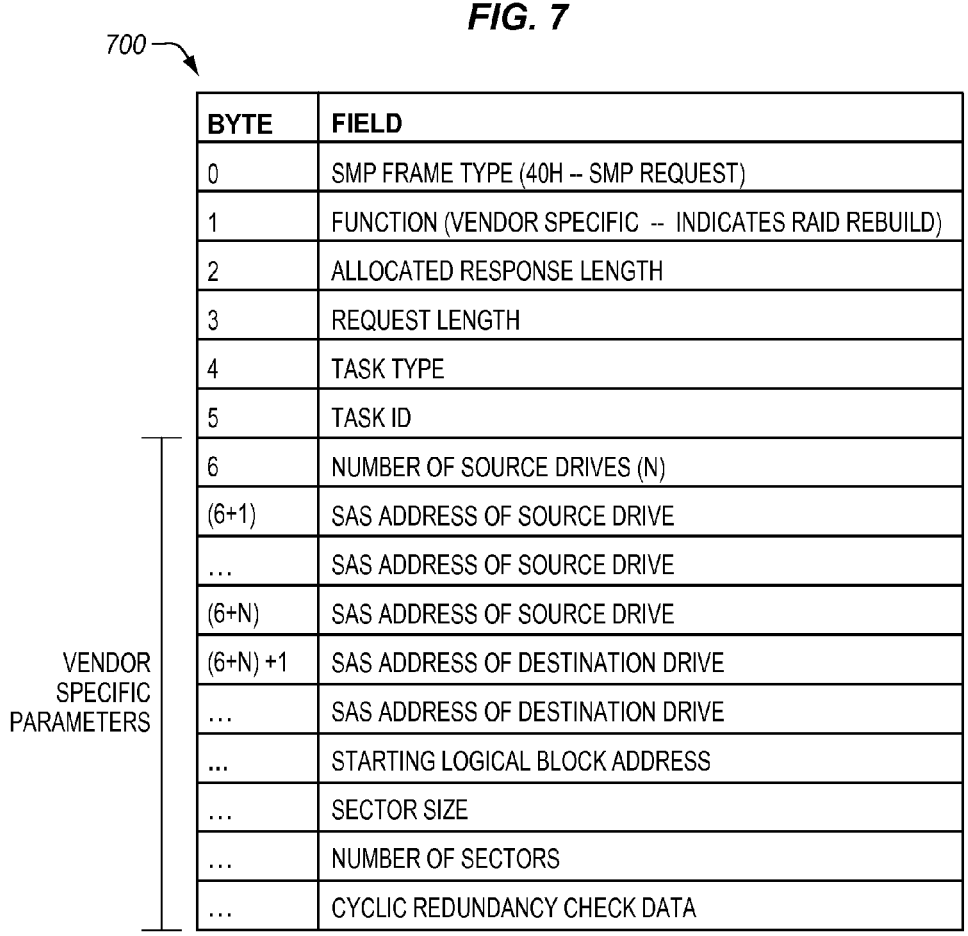
FIG. 7 is a block diagram illustrating an exemplary SMP request indicating that a rebuild should be performed on a RAID volume in accordance with features and aspects hereof.

FIGS. 7-10 illustrate exemplary commands exchanged between a RAID controller and an enhanced SAS expander in exemplary embodiments. FIG. 7 is a block diagram illustrating an exemplary SMP request 700 indicating that a rebuild should be performed on a RAID volume in accordance with features and aspects hereof. According to FIG. 7, the SMP request includes a number of parameters. These parameters include a task type and a task identifier (ID). A "task type" may include copy back, RAID 0 rebuild, RAID 1 rebuild, RAID 1E rebuild, RAID 10 rebuild, RAID 5 rebuild, RAID 6 rebuild, etc.

The task ID parameter allows the RAID controller to keep track of multiple rebuild operations at the same time. The RAID request may further include a variety of vendor specific parameters indicating the configuration of the RAID volume being rebuilt, the portions of the RAID volume to rebuild, destination drives to rebuild RAID information onto, etc.

Figure 8:
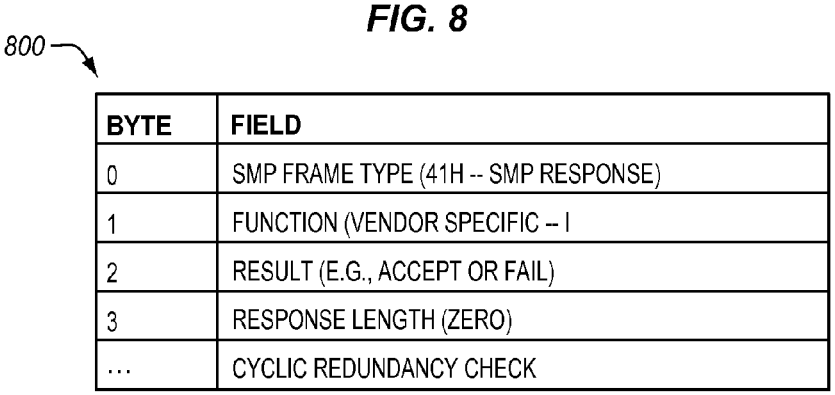
FIG. 8 is a block diagram illustrating an exemplary response to an SMP request in accordance with features and aspects hereof.

FIG. 8 is a block diagram illustrating an exemplary response 800 to an SMP request in accordance with features and aspects hereof. This response may be provided by a SAS expander to inform the RAID controller of whether the SAS expander has accepted the rebuild request or not. For example, the response may indicate whether the rebuild request was accepted or failed (i.e., rejected) by the SAS expander.

FIG. 9 is a block diagram illustrating an exemplary SMP request 900 for a status update regarding a rebuild of a RAID volume in accordance with features and aspects hereof. The status update request may be sent by a RAID controller during the rebuild to periodically check on the status of the rebuild. The request for a status update includes the task ID and task type of the rebuild, in case the expander is performing multiple rebuilds at the same time.

FIG. 10 is a block diagram illustrating an exemplary SMP response 1000 to a request for a status update regarding a rebuild of a RAID volume in accordance with features and aspects hereof Such a message may be issued by an expander in response to a status update request issued by a RAID controller. This may indicate whether the rebuild was completed successfully, whether the rebuild is still busy, or whether the rebuild encountered an error. If an error was encountered, the response may further provide error details to the RAID controller, which may enable the RAID controller to select an appropriate course of action to address the issue.

Figure 11:
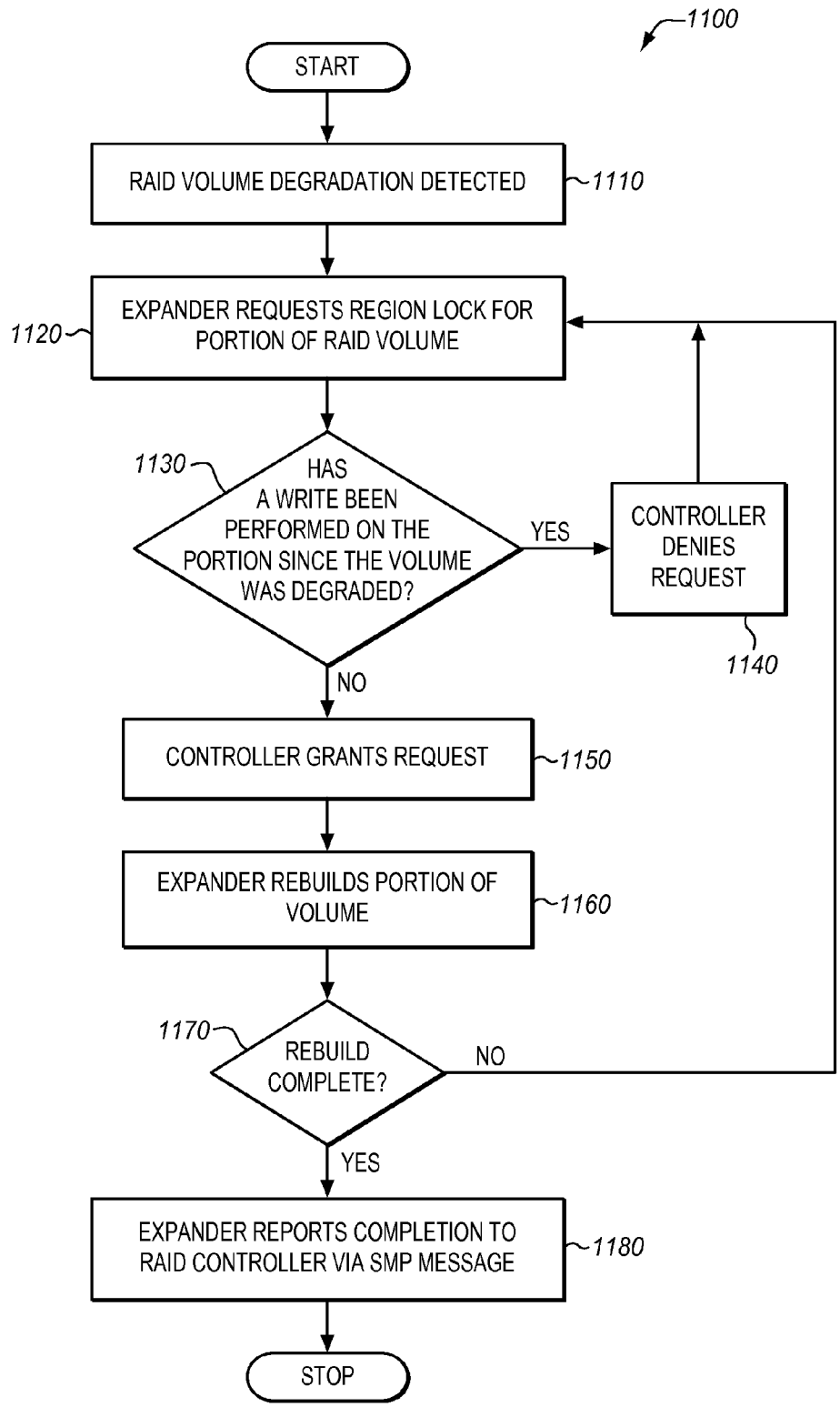
FIG. 11 is a flowchart illustrating a further method in accordance with features and aspects hereof to actively perform, via a SAS expander, a rebuild of a RAID volume in an exemplary embodiment.

FIG. 11 is a flowchart illustrating a further method in accordance with features and aspects hereof to actively perform, via a SAS expander, a rebuild of a RAID volume in an exemplary embodiment. FIG. 11 illustrates a similar process to that described above with regard to FIGS. 4-5 above. However, in FIG. 11, the expander performs a rebuild by locking one portion of the RAID volume at a time.

In step 1110, degradation of a RAID volume managed by a RAID controller is detected. For example, the SAS expander may detect the degradation of the volume by determining that a storage device that provisions the volume has gone offline. In a further embodiment, the RAID controller may detect volume degradation (e.g., during a write directed to the volume). If the expander detects volume degradation, it may request that the RAID controller allow it to perform a rebuild of the volume. Conversely, if the RAID controller detects that the volume is degraded, the RAID controller may send a message to the expander requesting a rebuild of the volume. This may further include information identifying the address of a hot spare to use during the rebuild in order to replace a storage device that has gone offline.

In step 1120, the expander requests a region lock for a portion of the RAID volume, by sending an SMP command to the RAID controller. The size of the portion varies as a matter of design choice, but may include, for example, a one megabyte range of Logical Block Addresses (LBAs) of the RAID volume.

In step 1130, the RAID controller determines whether the requested portion of the volume has been written to since the volume was degraded. If the requested portion of the volume has already been written to, then the requested portion of the volume has already been refreshed and rebuilt as a part of writing of new data to the volume. The data in the write request (and therefore, the new data for the portion of the RAID volume) will have already been appropriately written to the hot spare. Thus, if a write has been performed already to update the portion, the RAID controller may deny the request in step 1140.

Alternatively, if a write has not been performed on the requested portion of the RAID volume since the RAID volume degraded, the controller may grant the request from the expander to lock that portion of the volume in step 1150. Once the lock has been granted, the expander proceeds to rebuild the locked portion in step 1160. Once the rebuild of the portion has been completed, the expander may notify the controller of the success, and the controller may unlock the locked portion, allowing host I/O to be processed for the newly rebuilt portion. Then, the expander continues to step 1170, where it determines whether the entire volume has been rebuilt or not. If the entire volume has been rebuilt, the expander reports completion of the entire rebuild to the RAID controller (e.g., via an SMP message). However, if the entire volume has not been rebuilt, the expander may select a new portion of the RAID volume to lock and rebuild by returning to step 1120.

By incrementally locking each portion of the RAID volume, exchanges between the expander and the controller enable the controller to track the progress of the rebuild being performed at the SAS expander. At the same time, the SAS expander offloads work from the RAID controller because it performs the actual writes and reads of the rebuild.

FIG. 12 is a block diagram illustrating an exemplary SMP command 1200 from a RAID controller to assign a RAID volume to an expander in accordance with features and aspects hereof. This may be sent to the expander at start-of-day (e.g., during or after discovery). The command includes a number of parameters indicating the configuration of the RAID volume (e.g., a volume type to indicate the RAID level of the volume, the addresses of source drives that provision the volume, etc.). This command may further indicate the size of region locks that should be used by the expander when the expander performs a rebuild on the volume.

Note that as discussed herein, "assigning" a RAID volume to the SAS expander does not include granting full control over the RAID volume to the SAS expander. Rather, it simply indicates that the expander may be used in future rebuild tasks relating to the logical volume.

FIG. 13 is a block diagram illustrating an exemplary SMP response 1300 from an expander after receiving an SMP command to assign a RAID volume to the expander in accordance with features and aspects hereof. This SMP response indicates whether the expander accepts the assignment of the volume or rejects the assignment of the volume.

FIG. 14 is a block diagram illustrating an exemplary SMP command 1400 from a RAID controller to initiate a rebuild of a RAID volume at an expander in accordance with features and aspects hereof SMP command 1400 may be issued, for example, in response to the RAID controller detecting a SMART error or other error during a write to the volume.

FIG. 15 is a block diagram illustrating an exemplary SMP response 1500 from an expander indicating whether a request to rebuild a RAID volume has been accepted in accordance with features and aspects hereof SMP response 1500 indicates whether the rebuild has been accepted by the expander, or whether the expander has encountered an error in accepting the rebuild. For example, an error may result if the SAS expander has no information on the requested volume.

FIG. 16 is a block diagram illustrating an exemplary SMP command 1600 sent from an expander to a RAID controller to describe a degraded RAID volume in accordance with features and aspects hereof. In this embodiment, instead of the controller detecting degradation of the volume and requesting a rebuild from the expander, the expander detects degradation of the volume and asks permission from the controller to rebuild the volume. The controller then sends a response (an SMP command) requesting that the rebuild be initiated by the expander.

FIG. 17 is a block diagram illustrating an exemplary SMP response 1700 from a RAID controller to a SAS expander to the SMP command of FIG. 16 in accordance with features and aspects hereof. Thus, using SMP response 1700, the controller may grant or deny the request from the expander.

FIG. 18 is a block diagram illustrating an exemplary SMP command 1800 from an expander to a RAID controller requesting a lock for a portion of a degraded RAID volume in accordance with features and aspects hereof. This command may be sent after a rebuild has been initiated for a given RAID volume. The request includes data indicating the volume that the lock is requested for, the starting LBA of the lock, and the size of the region requested to be locked.

FIG. 19 is a block diagram illustrating an exemplary SMP response 1900 to the SMP command of FIG. 18 from a RAID controller to an expander in accordance with features and aspects hereof. This may be used to grant or deny region lock requests from the expander.

Figure 20:
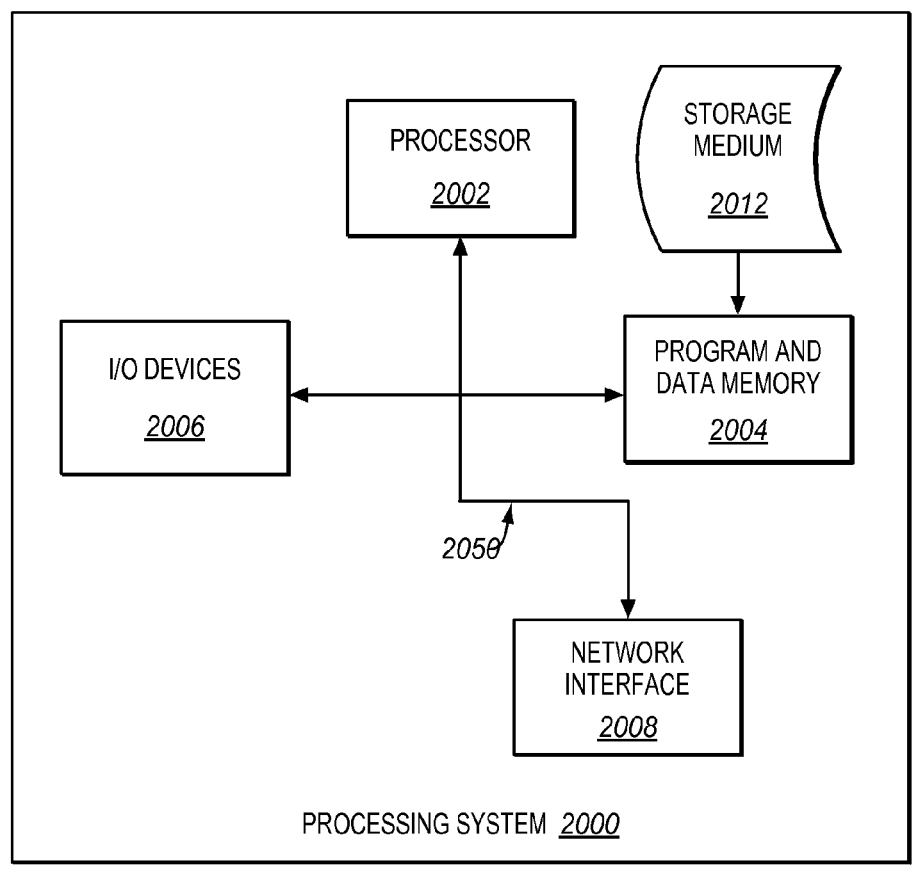
FIG. 20 illustrates an exemplary processing system operable to execute a computer readable medium embodying programmed instructions to perform desired functions in accordance with features and aspects hereof.

Embodiments disclosed herein can take the form of circuitry implementing software, the form of hardware or various combinations thereof. In one particular embodiment, software is used to direct a processing system of an enhanced SAS expander and/or RAID controller to perform the various operations disclosed herein. FIG. 20 illustrates a processing system 2000 operable to execute a computer readable medium embodying programmed instructions to perform desired functions in an exemplary embodiment. Processing system 2000 is operable to perform the above operations by executing programmed instructions tangibly embodied on computer readable storage medium 2012. In this regard, embodiments of the invention can take the form of a computer program accessible via computer-readable medium 2012 providing program code for use by a computer or any other instruction execution system. For the purposes of this description, computer readable storage medium 2012 can be anything that can contain or store the program for use by the computer.

Computer readable storage medium 2012 can be an electronic, magnetic, optical, electromagnetic, infrared, or semiconductor device. Examples of computer readable storage medium 2012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 2000, being suitable for storing and/or executing the program code, includes at least one processor 2002 coupled to program and data memory 2004 through a system bus 2050. Program and data memory 2004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 2006 (e.g., PHYs) can be coupled either directly or through intervening I/O controllers. Network adapter interfaces 2008 may also be integrated with the system to enable processing system 2000 to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) system comprising:
   a SAS expander comprising:
      a Serial Management Protocol (SMP) target operable to receive, from a Redundant Array of Independent Disks (RAID) controller, an SMP command for initiating a rebuild of a RAID volume at the SAS expander;
      a control unit operable to initiate a rebuild of the RAID volume based on the received SMP command from the controller; and
      a Serial SCSI Protocol (SSP) initiator operable to generate SSP commands for performing the RAID rebuild based upon input from the control unit.

2. The system of claim 1 further comprising:
   the RAID controller, wherein the RAID controller is operable to generate the SMP command for initiating the rebuild of the RAID volume instead of generating SSP commands to perform the rebuild.

3. The system of claim 2 wherein:
   the RAID controller is further operable to process host Input/Output (I/O) commands directed to another RAID logical volume during the rebuild wherein the host I/O commands are processed independently of the rebuild.

4. The system of claim 3 wherein
   the processing of the host I/O commands at the RAID controller does not delay processing of the rebuild at the expander, and the processing of the rebuild at the expander does not delay processing of the host I/O commands at the RAID controller.

5. The system of claim 1 wherein:
   the SAS expander is directly coupled with storage devices that provision the RAID volume.

6. The system of claim 1 wherein:
   the SSP initiator is further operable to perform the rebuild by generating SSP commands that trigger the writing of data from the RAID volume to a hot spare storage device.

7. The system of claim 1 wherein:
   the control unit of the expander is further operable to maintain progress information indicating the status of the RAID rebuild, and to provide the progress information to the RAID controller.

8. The system of claim 1 wherein:
   the SMP command indicates a SAS address of a hot spare storage device to utilize during the rebuild.

9. The system of claim 1 wherein:
   the SMP command indicates a configuration of the RAID volume as it resides on storage devices that provision the RAID volume.

10. A method comprising:
    receiving, at a Serial Management Protocol (SMP) target of a SAS expander, an SMP command from a Redundant Array of Independent Disks (RAID) controller for initiating a rebuild of a RAID volume;
    initiating, via a control unit of the expander, a rebuild of the RAID volume based on the received SMP command from the controller;
    generating, at a Serial SCSI Protocol (SSP) initiator of the expander, SSP commands for performing the RAID rebuild based upon input from the control unit; and
    transmitting the generated SSP commands to storage devices that provision the RAID volume.

11. The method of claim 10 further comprising:
    generating, at the RAID controller, the SMP command for initiating the rebuild of the RAID volume; and
    transmitting the SMP command from the RAID controller to the SAS expander.

12. The method of claim 11 further comprising:
    processing, at the RAID controller, host Input/Output (I/O) commands directed to another RAID logical volume during the rebuild, wherein the host I/O commands are processed independently of the rebuild.

13. The method of claim 12 wherein:
    the processing of the host I/O commands at the RAID controller does not delay processing of the rebuild at the expander, and the processing of the rebuild at the expander does not delay processing of the host I/O commands at the RAID controller.

14. The method of claim 10 wherein:
    transmitting the generated SSP commands comprises transmitting the generated SSP commands from ports of the expander to directly coupled storage devices that provision the RAID volume.

15. The method of claim 10 further comprising:
    performing the rebuild by generating SSP commands that trigger the writing of data from the RAID volume to a hot spare storage device.

16. The method of claim 10 further comprising:
    maintaining progress information indicating the status of the RAID rebuild at the expander; and
    providing the progress information to the RAID controller.

17. The method of claim 10 wherein:
    the SMP command indicates a SAS address of a hot spare storage device to utilize during the rebuild.

18. The method of claim 10 wherein:
    an SMP command indicates a configuration of the RAID volume as it resides on storage devices that provision the RAID volume.

19. A non-transitory computer readable medium embodying programmed instructions which, when executed by a processor, are operable for performing a method comprising:
    receiving, at a Serial Management Protocol (SMP) target of a SAS expander, an SMP command from a Redundant Array of Independent Disks (RAID) controller for initiating a rebuild of a RAID volume;

initiating, via a control unit of the expander, a rebuild of the RAID volume based on the received SMP command from the controller;

generating, at a Serial SCSI Protocol (SSP) initiator of the expander, SSP commands for performing the RAID rebuild based upon input from the control unit; and transmitting the generated SSP commands to storage devices that provision the RAID volume.

20. The medium of claim 19, the method further comprising:

maintaining progress information indicating the status of the RAID rebuild at the expander; and providing the progress information to the RAID controller.

* * * * *